Dec. 7, 1926.

R. B. SHANCK

DISTORTION MEASURING SYSTEM

Filed May 10, 1923   2 Sheets-Sheet 1

1,609,383

INVENTOR
R. B. Shanck
BY
ATTORNEY

Dec. 7, 1926.

R. B. SHANCK

DISTORTION MEASURING SYSTEM

Filed May 10, 1923   2 Sheets-Sheet 2

INVENTOR
R. B. Shanck
BY
ATTORNEY

Patented Dec. 7, 1926.

1,609,383

UNITED STATES PATENT OFFICE.

ROY B. SHANCK, OF WOODSIDE, NEW YORK, ASSIGNOR TO AMERICAN TELEPHONE AND TELEGRAPH COMPANY, A CORPORATION OF NEW YORK.

DISTORTION-MEASURING SYSTEM.

Application filed May 10, 1923. Serial No. 638,125.

This invention relates to electrical measuring systems and particularly to means for determining the existence and the magnitude of distortion of telegraph signaling impulses produced in the course of transmitting the said impulses between two stations upon the same line.

In the transmission of telegraph signals, each made up of a plurality of impulses, and each impulse having a definite length, distortion of the impulses (and therefore of the signals) may be produced by various causes inherent in the line or in the apparatus connected therewith or both. The distortion with which this invention is concerned manifests itself in lengthening or shortening the duration of the impulses which constitute the signal transmitted over the line. This lengthening or shortening of the duration of the impulse interferes with the proper recording of the signals at any station connected with the said line and consequently impairs the efficiency of transmission.

Various systems for determining the existence and the magnitude of this form of distortion have been devised and used, but, due either to the complexity of the apparatus required or to other causes, they have not been widely used. One such method consists in the use of a Wheatstone tape recorder connected with the receiving end of a line, to which perfect signals are applied at the sending end for the purpose of recording the said signals at the receiving ends. The tape records of these signals are then measured whereby any distortion and the magnitude thereof may be determined. This method, however, is quite laborious and expensive, and furthermore, is generally unsatisfactory. Other ways employed heretofore indicate only average distortion.

It is the object of this invention to provide an arrangement for measuring the distortion of telegraph signals which is adapted to give an almost instantaneous indication of the existence of the distorted impulse, and furthermore is adapted to determine the relative magnitude of the distortion.

Figure 1:
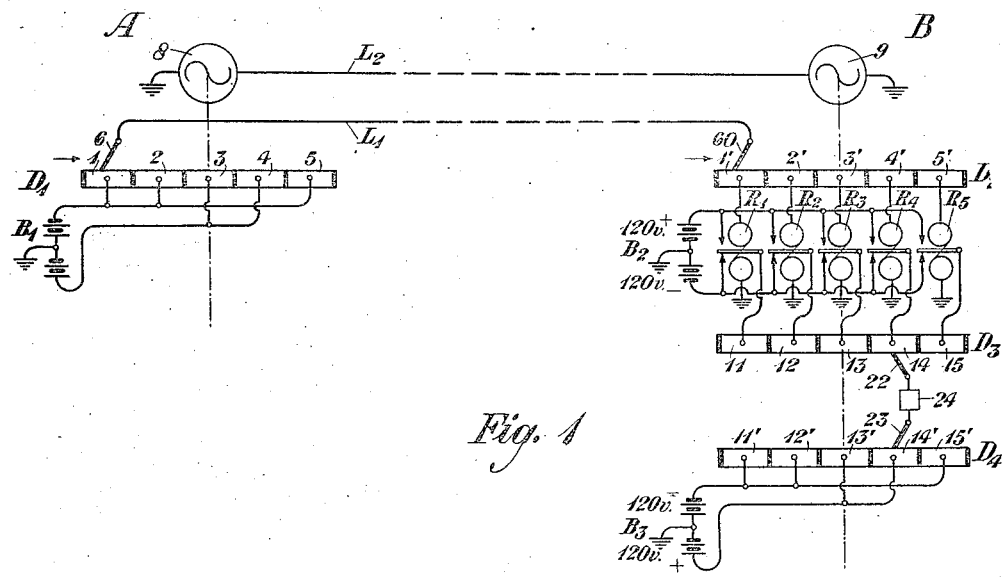
Figure 1A:
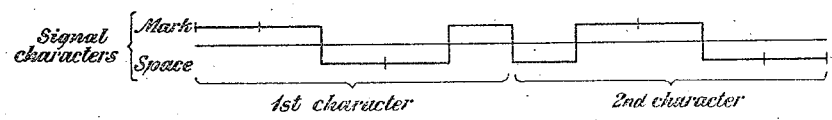
Figure 2:
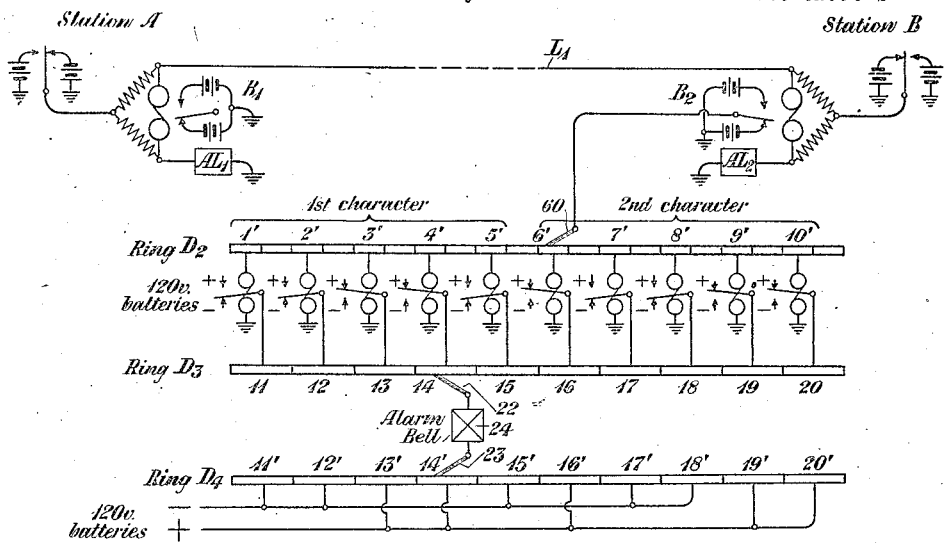
Figure 3:
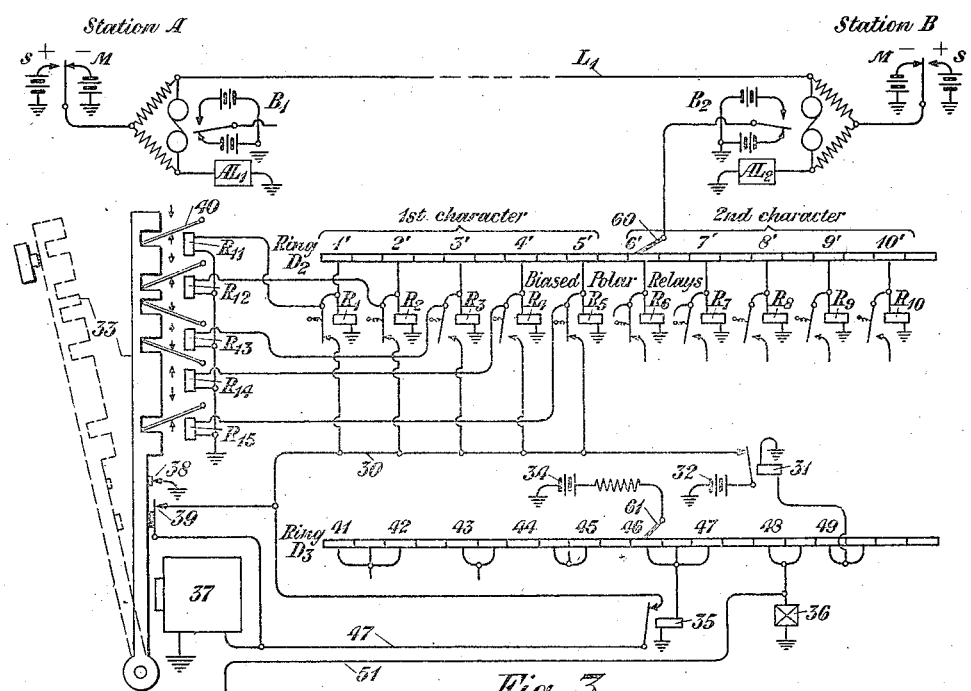

This invention is shown in several forms in the drawing, of which Fig. 1 represents schematically a simple form of embodiment of the invention; Fig. 1ª is a graph used in describing the invention; Fig. 2 is a modification of the form shown in Fig. 1; and Fig. 3 represents a form of the invention in which the distortion is determined by means of a mechanical standard instead of by an electrical standard, as shown in Figs. 1 and 2.

For the purpose of describing this invention, A represents a transmitting station and B a receiving station connected in Fig. 1 by means of the lines $L_1$ and $L_2$. At station A, a rotary distributor $D_1$ comprising a plurality of segments 1, 2, 3, 4 and 5, and a brush 6 is connected with the line $L_1$. These segments, which are insulated from each other, are connected with a source of potential $B_1$ by means of which a potential to ground of definite polarity may be applied thereto. As shown in Fig. 1, segments 1, 2 and 5 are connected with the negative pole of source 7 and segments 3 and 4 with its positive pole, so that as the brush 6 travels in the direction indicated by the arrow the first signal character represented graphically by Fig. 1ª will be applied to the line $L_1$. The distributor $D_1$ is rotated by means of a synchronous motor 8 connected with the line $L_2$ to which is also connected at station B another synchronous motor 9, the purpose of which is to operate similar distributors at the latter station in synchronism with that at station A. But any well known means for maintaining synchronism of the distributors at the two ends of the line may be used, such as the phonic wheel motor used in printing telegraph systems.

At station B the line $L_1$ is connected with the brush 60 of the distributor $D_2$. This distributing ring comprises a plurality of segments designated 1', 2', 3', 4', 5' which are preferably similar in size and spacing to the corresponding segments of the distributor $D_1$ at station A. Each segment of $D_2$ is connected with one of the relays $R_1$, $R_2$, $R_3$, $R_4$ and $R_5$. The armature of each relay is connected with a segment of a distributing ring $D_3$, and the contacts of the said relays are connected with the positive and negative pole respectively of the grounded battery $B_2$. The receiving apparatus contains also a fourth distributing ring $D_4$ which is similar in the size and the spacing of its segments to the ring $D_1$, and is also similar thereto in that its segments are connected with the same poles of the grounded battery $B_3$ as is the ring $D_1$. Connected between the brushes 22 and 23 of the rings $D_3$ and $D_4$ is an indicating device 24, which may be of any type adapted to show a flow of current therethrough. The distributing rings $D_2$, $D_3$ and $D_4$ are connected with the same shaft (represented by the dot and dash line) so as to be rotated simultaneously and at the same rate by means of the synchronous motor 9. The ring $D_2$ is, however, adapted to be oriented upon the shaft, in order to determine the margin that the system possesses for the reception of signaling impulses.

Having in mind the foregoing description of the form of embodiment of the invention shown in Fig. 1, the nature of the invention will be clearly understood from the following description of the method of determining the existence and magnitude of distortion of signaling impulses. This method comprises four steps as follows:

1. Calibration of the receiving apparatus in order to determine the margin when the received signals are undistorted.

2. Adjusting the receiving apparatus in order to compensate for the time lag between the transmittal and reception of signals.

3. Determination of the margin for signaling impulses transmitted over the line from the distant end, which may be distorted or undistorted depending upon the characteristics of the circuits.

4. Interpretation of the difference in margin in terms of distortion.

In order to calibrate the receiving apparatus, that is, to determine the distance through which the ring $D_2$ may be oriented in a right-hand or left-hand direction before failure occurs to properly receive signals, it is necessary to apply to the said ring undistorted signals. Such signals may be derived from any suitable source such as another ring, similar to $D_4$, having sources of potential connected therewith in such manner as to represent the same signal character as is set up on ring $D_4$. Such a source of undistorted signals should be connected directly with the brush 60 so that the signaling impulses applied to the ring $D_2$ would be distortionless. While these impulses, which, as stated, should represent the same signal character as is set up on the ring $D_4$, are being applied to the ring $D_2$, and, further, while the brushes 60, 22 and 23 are traversing rings $D_2$, $D_3$ and $D_4$ respectively, the ring $D_2$ should be oriented upon its axis in one direction until failure occurs, which would be indicated by the operation of the device 24. Then the ring $D_2$ should be oriented in the opposite direction until an indication of failure to properly receive signals is given by the device 24. The manner in which the system operates to indicate failure to properly receive signals is as follows:

Since we have assumed that the source of distortionless signals is arranged to apply to the ring $D_2$ the same signal character as is set up on ring $D_4$, there will be applied to the ring $D_2$ a signal comprising two negative, two positive and a negative impulse in the sequence named. The application of the first negative impulse will continue as long as the brush 60 remains in contact with the segment 1'; the second negative impulse as long as the said brush remains in contact with the segment 2', and in like manner the succeeding impulses will continue as long as the said brush remains in contact with the respective segments, assuming, of course, that the said source is not only in synchronism but also in phase with $D_2$. Accordingly, the relays $R_1$, $R_2$, etc., will be operated by the said impulses, and their armatures will be moved to one or the other of their respective contacts, depending upon the polarity of the impulse applied to the respective relays. In consequence thereof, each segment of the ring $D_3$ will be connected with a terminal of the battery $B_2$, and the signal thereby set up on the segments of the ring $D_3$ will be the same signal as is set up on the ring $D_4$. Accordingly, as the brushes 22 and 23 move together over the corresponding segments of the rings $D_3$ and $D_4$, no current will flow through the indicating device 24 because the potential applied to the same brushes and the polarity thereof are the same.

Now, if the ring $D_2$ is oriented, for example, in the right-hand direction, a point will be reached where, for example, a negative impulse will be applied to the relay $R_2$. This is evidenced by the fact that segment 13 of ring $D_3$ is connected with the negative pole of battery $B_2$, which makes the polarity of 13 different from that of segment 13' of ring $D_4$ so that when the brushes 22 and 23 connect the alarm device 24 between the said two segments, a signal will be given indicating that the ring $D_2$ has been oriented so far as not to receive the signal correctly. The point where such failure occurs is noted upon the ring $D_2$. Then the said ring is moved toward the left until one of the relays, as $R_1$ for example, is operated by a positive impulse which will be indicated in like manner by the device 24. This point of failure is accordingly noted upon the ring $D_2$. The distance between the two points is known as the range of orientation without distortion, and one-half of this distance represents the margin. The ring $D_2$ is then left in such position as to receive each signal impulse at a point midway between the two extremes of its range.

Having determined the margin through which the receiving ring $D_2$ may be oriented before failure, when receiving distortionless signals, the receiving apparatus should then be connected to the line $L_1$ and adjusted to compensate for the time lag resulting from the transmission of signals over the said line. This adjustment consists in orienting the ring $D_2$ in such direction and to such extent that the brush 60 will begin to make contact with the segment 1' when the first impulse of the signal transmitted over the line $L_1$ from station A begins to arrive at station B. Since the rings at stations A and B are operated in synchronism, and since there is a time lag in the transmission of a signal from A to B, the brush 60 will have traveled some distance along the segment 1' before the signal transmitted from $D_1$ begins to arrive at station B if the brush 60 began to make contact with $D_2$ at the same time as the brush 6 did with $D_1$. This adjustment for the time lag consists simply in orientating the ring $D_2$ so that the brush 60 moves over the segment 1' while the signal transmitted from segment 1 of ring $D_1$ arrives at station D.

Having calibrated the distortion measuring apparatus, viz, having determined its margin for distortionless signals, and, furthermore, having adjusted the receiving apparatus for time lag, the next step consists in determining the change in the margin due to distortion of signals as received at station B.

Let it be assumed that the transmitting apparatus at station A is sending the first signal character shown in Fig. 1ª, consisting of two marking impulses followed by two spacing impulses, which, in turn, are followed by a single marking impulse. As these impulses are transmitted over the line, they may be distorted, the distortion consisting in the lengthening or the shortening of the period of duration of an impulse. If, therefore, any impulse is lengthened or shortened when it arrives at station B and is applied by the brush 60 to the segments of the ring $D_2$, such lengthening or shortening will be manifested by the operation of the device 24 when the ring $D_2$ is oriented. This will be clear if we consider, for example, that the third impulse, viz, a spacing character, is lengthened, which, of course, means that the preceding character has been somewhat shortened. It will be apparent that the direction of motion of the armatures of relays $R_1$ to $R_5$ inclusive depends upon the polarity of the impulse applied to the respective segments at the instant when the brush is just about to leave the said segment and to pass on to the next succeeding one. Accordingly, if the spacing character is lengthened, the preceding marking character will be somewhat shortened so that the brush 60, when about to pass from the segments 2' to 3', will apply to the relay $R_2$ a positive impulse which will operate the relay accordingly.

Consequently the segment 12 of ring $D_3$ will be connected with the positive pole of the battery $B_2$, and since its corresponding segment 12' of the ring $D_4$ is connected with the negative pole of the battery $B_3$, the presence of distortion in the signal will be manifested by the operation of the device 24. To determine the magnitude of this distortion, the ring $D_2$ should be oriented in both directions, and the distance in which it can be moved before failure occurs indicates the margin for distorted signals. It will be found that when distortion is present the ring $D_2$ cannot be oriented through as great angular distance as it can when receiving distortionless signals. The difference between the margin with no distortion and the margin with distortion is the measure of distortion of the signal.

The arrangement shown in Fig. 2 shows a larger distributing ring $D_2$ whereby a second and preferably a different signaling character may be received over the line $L_1$ and stored up in effect by means of the plurality of relays $R_6$ to $R_{10}$ inclusive. Thus, in Fig. 2 the correctness of transmission, i. e., freedom from distortion of the signaling impulse representing the first character, may be investigated by the relative movement of the brushes 22 and 23 over the first five segments of the distributing rings $D_3$ and $D_4$ respectively while the brush 60 is storing up the impulses constituting the second character of the transmitted signal. It is to be understood, of course, that the distributing rings are not limited to any particular size, nor are the signal characters limited to any particular number of impulses.

The arrangement shown in Fig. 3 consists in the utilization of a mechanical standard in place of the electrical standard represented by distributing ring $D_4$ of the previous figures. The impulses transmitted over the line $L_1$ from the transmitter at station A will be impressed by means of the brush 60 upon the segments of the distributing ring $D_2$. Associated with the distributing ring $D_2$ is another distributing ring $D_5$ having the same number of segments as $D_2$, whose function will be clear from the following description: Each segment 1', 2', etc., has individual thereto and connected therewith a relay designated $R_1$, $R_2$, etc., which is connected to ground but is adapted to be locked up over a circuit, including its armature and contact, conductor 30, and the back contact of relay 31 by means of the source of potential 32 connected therewith. Also connected with each of the segments 1', 2', etc., and individual thereto, are the neutral relays $R_{11}$, $R_{12}$, etc., the armatures which preferably are in the nature of pins, are adapted to engage the slots in the movable arm 33 which acts as a standard, by means of which the accuracy of the received signaling impulses is determined. Connected with the distributing ring $D_3$ is a brush 61 having a source of potential 34 connected therewith by means of which the relay 35 and also the alarm signal or other indicating device 36 may be operated. The solenoid 37 is controlled through the armature of the relay 35 and in turn controls the operation of the measuring device 33.

The method by which the existence and the magnitude of distortion may be determined will be clear from the following description of the manner in which the aforedescribed apparatus operates. Let it be assumed that a brush 60 rests upon the segment 1' and the brush 61 upon the segment 41 and that the "first character" of the signal shown in Fig. 1ª is being applied by station A to the line $L_1$. An impulse of current will therefore be applied by the source $B_2$ to the relay $R_1$ and relay $R_{11}$, and assuming that the signal impulse has not been biased the polarity of the impulses will be such as to operate both of said relays. Relay $R_1$ will lock up over the circuit extending from the source 32, back contact of relay 31, conductor 30, front contact of relay $R_1$ and the winding thereof to ground; similarly relay $R_{11}$ will be locked up by current from the source 32. The armature 40 of relay $R_{11}$ will be pulled downward so as to engage the corresponding slot on the comparison bar 33. As the brush 60 travels over the successive segments 2', 3', etc., and there is no distortion of the received signals, the associated relays $R_2$, $R_3$, etc., will be operated or not operated (depending upon the polarity of the applied impulses). Since we assume in this case that the first signal character of Fig. 1ª is being received by the ring $D_2$, which character comprises two negative impulses, two positive impulses and a negative impulse, and furthermore, since there is no distortion, the armatures of relays $R_{11}$, $R_{12}$ and $R_{15}$ will be drawn downward and those of relays $R_{13}$ and $R_{14}$ will remain upwards in the manner shown in the drawing. During the operation of the relays $R_{11}$ to $R_{15}$ inclusive, the comparison bar 33 occupies the position represented by the dotted line, because the circuit of the solenoid 37 is open.

After the received signal character has been stored up by the relays $R_{11}$ to $R_{15}$ inclusive, the determination of the correctness of the received signal is made in the following manner. It should be remembered that the position of the slots in the comparison bar depends upon the nature of the impulses constituting the signal character being transmitted from the distant station. Since the first, second and fifth impulses of the assumed signal character are marking impulses and the third and fourth are spacing impulses, the first, second and fifth slots (counting downwards) are in such position as to receive the pin-like armatures of relays $R_{11}$, $R_{12}$, etc., when those armatures have been attracted by the application of marking impulses to the said relays; and, similarly, the third and fourth slots are positioned to receive the armatures of relays $R_{13}$ and $R_{14}$ when they have been repelled by the application of a spacing impulse to the said latter relays. When the brush 61 of the ring $D_3$ reaches the segment 46, which corresponds to the position of the brush 60 upon the segment 6', the relay 35 is energized, causing its armature to close the circuit from the source 32, conductor 30, armature of relay 35, conductor 47 through the solenoid 37 to ground. The comparison bar 33, which is in effect the armature of the solenoid 37, will be attracted and drawn into the position represented by the solid line, if the armatures of the relays $R_{11}$ to $R_{15}$ inclusive, are in such position as to enter their respective slots of the device 33. If this occurs, the bar 33 will be grounded at the point 38, the purpose of which will be made clear shortly. The relay 35 will be maintained energized during the passage of the brush 61 over the contacts 46 and 47. But the circuit of the solenoid 37 is locked up through a circuit from the source 32, conductor 30, contact 39 and solenoid 37 to ground, so that it is not released when the relay 35 is deenergized upon the passing of the brush 61 from the segment 47. When the brush reaches the segment 48, current from the source 34 would tend to flow through the alarm bell 36 to ground, but the latter is effectively shunted by the circuit, including conductor 51, the comparison bar 33 and contact 38 to ground.

In order to make the invention clear, assume a case of distortion, as, for example, when the negative impulse applied to segment 2' is sufficiently prolonged as to continue throughout the time that the brush 60 is passing over the segment 3'. This would cause the operation of the relay $R_3$ and in like manner the operation of the relay $R_{13}$, pulling the armature of the latter into its downward position, so that it would not engage its corresponding slot in the comparison bar 33 when the latter has been attracted toward the pin-like armatures by the subsequent operation of the solenoid 37. The existence of this distortion would not be apparent until the brush 60 and the corresponding brush 61 had moved onto segments 6' and 46 respectively. By the operation of relay 35, the circuit of the solenoid 37 would be closed, and the comparison bar 33 would be drawn against the armatures of the relays $R_{11}$ to $R_{15}$ inclusive. Since, however, the signaling impulse applied to segment 3' was distorted, the armature of relay $R_{13}$ by its failure to coact with its corresponding slot will prevent the arm from closing the contacts 38 and 39. Accordingly, when the brush 61 moves beyond the contact 47, the relay 35 will be released, and the solenoid 37 will be deenergized because the holding circuit through contact 39 will be open. Furthermore, when the brush 61 moves onto segment 38, the alarm bell 26 will ring because the shunt path to ground over conductor 51 and the comparison bar 33 will be open at contact 38.

When the brush 61 reaches segment 49, the circuit including the winding of relay 31 is closed thereby attracting its armature and opening the holding circuit of the relays $R_1$ to $R_5$ inclusive, associated with the segments 1', 2', etc., and also the holding circuit of the relays $R_{11}$ to $R_{15}$ inclusive, whereby all of said relays will be released rendering these relays available for storing up a new set of impulses when the brush 60 is in position to travel over segments 1' to 5' inclusive. The circuit connections of the relay equipment for the segments 1' to 5' inclusive and the comparison bar therefor only have been shown. It is to be understood, however, that similar sets of relays and another comparison bar would be provided for the segments 6' to 10' inclusive. In like manner segments 41 and 42 (and the intervening segment) would be connected with a relay such as 35 to control the solenoid for operating the second comparison bar. Segment 43 and the succeeding one would be connected with an alarm device such as 36; and segment 45 and its preceding neighbor would be connected with a clearing-out relay such as 31. Relays $R_6$ to $R_{10}$ would be connected in the same manner as relays $R_1$ to $R_5$ inclusive, but their function would be to store up as it were the impulses constituting the second signal character of Fig. 1$^a$. After the brush 60 has passed over segments 6' to 10' inclusive and has returned to segment 1', the brush 61 would return to segment 41 and the process of checking the accuracy of the signal stored up by relays $R_6$ to $R_{10}$ inclusive would begin.

While this invention has been disclosed as embodied in a definite form and arrangement of parts it is to be understood that it is not limited thereby but is capable of embodiment in other and different forms within the spirit and scope of the appended claims.

What is claimed is:

1. In a distortion measuring system, the combination with a source of signal characters each consisting of marking and spacing impulses of a second source of similar signal characters operated in synchronism with the said first source, a line circuit, means for effectively storing the impulses constituting each signal character received from said first source, and means for comparing each stored-up impulse with the corresponding impulse of the said second source.

2. In a distortion measuring system, the combination with a source of signal characters each consisting of marking and spacing impulses of a second source of similar signal characters operated in synchronism with the said first source, a line circuit, means for effectively storing the impulses constituting each signal character received from said first source, means for comparing each stored-up impulse with the corresponding impulse of the said second source, and means to indicate any variation between correspondingly timed impulses.

3. In a distortion measuring system, the combination with a source of definite signal characters each consisting of marking and spacing impulses of a plurality of electro-responsive devices, switching means for applying said impulses to said devices whereby the armature of each device will be connected with that pole of a source of potential corresponding to the impulse actuating the said device, and means to compare the polarity of the potential of each armature with the corresponding impulse of the signal character applied by the said first mentioned source of signal characters.

4. In a distortion measuring system, the combination with a source of signal characters each consisting of one or more impulses of definite polarity, of a second source of similar signal characters operated in synchronism with the said first source, a line circuit, means for effectively storing the impulses constituting each signal character received from said first source, and means for comparing each stored-up impulse with the corresponding impulse of the said second source.

5. In a distortion measuring system, the combination with a source of signal characters each consisting of one or more impulses of definite polarity, of a second source of similar signal characters operated in synchronism with the said first source, a line circuit, means for effectively storing the impulses constituting each signal character received from said first source, means for comparing each stored-up impulse with the corresponding impulse of the said second source, and means to indicate any variation in polarity between correspondingly timed impulses.

6. In a distortion measuring system, the combination with a source of definite signal characters each consisting of one or more impulses of definite polarity, of a plurality of electro-responsive devices, switching means for applying the said impulses to the said devices whereby the armature of each device will be moved to a definite position depending upon the polarity of the impulse actuating the said device, and means for determining the correctness of each impulse received from the said first mentioned source.

7. In a distortion measuring system, the combination with a source of definite signal characters each consisting of one or more impulses of definite polarity, of a plurality of electro-responsive devices, switching means for applying said impulses to said devices whereby the armature of each device will be connected with that pole of a source of potential corresponding to the impulse actuating the said device, and means to compare the polarity of the potential of each armature with the polarity of the corresponding impulse of the signal character applied by the said first mentioned source of signal characters.

8. In a distortion measuring system, the combination with a line circuit of a distributing ring and a source of potential for applying signaling impulses thereto, of a second distributing ring connected with the said line and synchronized with the said first distributing ring, a plurality of relays operated by impulses applied to the second distributing ring by the said line circuit, a third distributing ring each segment of which is connected with an armature of one of said relays, a fourth distributing ring each segment of which has applied thereto the same potential as the corresponding segment of the said first ring, all of said rings being operated in synchronism, and means containing a current indicating device for comparing the polarity of the sources of potential connected with the corresponding segments of the said third and the said fourth distributing rings.

9. In a distortion measuring system, the combination with a line circuit of transmitting means for applying signaling impulses of definite polarity thereto, of switching means also connected with the said line circuit, a plurality of relays connected with the said switching means, each of said relays being responsive to a single impulse applied thereto by the said switching means, a second switching means comprising a plurality of segments connected with the armatures of the said relays, so that each segment will be connected with a source of potential of definite polarity depending upon the polarity of the impulse actuating the relay associated with the said segment, a third switching means comprising a plurality of segments each of which has applied thereto the same polarity of potential as the correspondingly times impulse applied by the said transmitting means to the said line, each of said switching means being operated in synchronism with the said transmitting means, and means to determine a difference of polarity between the corresponding segments of the said second and the said third switching means.

10. In a distortion measuring system, the combination with a source of signaling impulses of means for receiving said impulses, and means for automatically indicating which of said impulses may be distorted.

11. In a distortion measuring system, the combination with a source of signaling impulses of means for receiving said impulses, and means for automatically determining the existence of distortion of any impulse and the approximate magnitude of such distortion.

In testimony whereof, I have signed my name to this specification this 8th day of May, 1923.

ROY B. SHANCK.